US009268556B2

(12) United States Patent
Murase

(10) Patent No.: US 9,268,556 B2
(45) Date of Patent: Feb. 23, 2016

(54) IMAGE FORMING APPARATUS INCLUDING FIRMWARE, METHOD OF CONTROLLING IMAGE FORMING APPARATUS, AND STORAGE MEDIUM

(75) Inventor: Yoko Murase, Yokohama (JP)

(73) Assignee: CANON KABUSHIKI KAISHA (JP)

( * ) Notice: Subject to any disclaimer, the term of this patent is extended or adjusted under 35 U.S.C. 154(b) by 721 days.

(21) Appl. No.: 12/899,230

(22) Filed: Oct. 6, 2010

(65) Prior Publication Data

US 2011/0093839 A1 Apr. 21, 2011

(30) Foreign Application Priority Data

Oct. 15, 2009 (JP) ................................. 2009-238160

(51) Int. Cl.
*G06F 9/44* (2006.01)
(52) U.S. Cl.
CPC ........................................ *G06F 8/68* (2013.01)
(58) Field of Classification Search
CPC ........................ G06F 8/60–8/68; G06F 11/1433
See application file for complete search history.

(56) References Cited

U.S. PATENT DOCUMENTS

| 5,805,898 | A * | 9/1998 | Barsness et al. ............... 717/175 |
| 6,094,548 | A * | 7/2000 | Gunning et al. ................. 399/75 |
| 2004/0145766 | A1 * | 7/2004 | Sugishita et al. ............ 358/1.13 |
| 2004/0220999 | A1 * | 11/2004 | Kojima et al. ................. 709/201 |
| 2004/0250247 | A1 * | 12/2004 | Deeths et al. .................. 717/175 |
| 2005/0141025 | A1 | 6/2005 | Hanada |
| 2007/0220510 | A1 * | 9/2007 | Bell et al. ....................... 717/174 |
| 2007/0261056 | A1 * | 11/2007 | Iizuka ............................ 718/100 |
| 2007/0294684 | A1 * | 12/2007 | Kumashiro et al. ............ 717/168 |
| 2008/0189693 | A1 * | 8/2008 | Pathak ............................ 717/168 |
| 2008/0263540 | A1 | 10/2008 | Bando et al. |
| 2009/0235239 | A1 * | 9/2009 | Lee et al. ....................... 717/140 |

FOREIGN PATENT DOCUMENTS

| JP | 2007-310783 A | 11/2007 |
| JP | 2007-334636 A | 12/2007 |

(Continued)

OTHER PUBLICATIONS

Extended European Search Report issued in corresponding European Patent application No. 10187633.2 dated Feb. 17, 2011.
KR Office Action issued May 29, 2013 for corres. KR 10-2010-0100602.

(Continued)

*Primary Examiner* — Van Nguyen
*Assistant Examiner* — Melissa Alfred
(74) *Attorney, Agent, or Firm* — Rossi, Kimms & McDowell LLP

(57) ABSTRACT

An image forming apparatus which makes it possible to improve the ease and convenience of firmware update processing. The image forming apparatus includes storage units. The image forming apparatus identifies differential packages and acquires the differential packages from an update server. Then, the image forming apparatus acquires package information from the differential packages. Further, the image forming apparatus identifies storage units as installation destinations where the differential packages are to be installed, based on the package information. Then, the image forming apparatus calculates an update processing time period required to install the acquired packages in the identified storage units. The image forming apparatus notifies a user of the calculated update processing time period.

7 Claims, 12 Drawing Sheets

(56) References Cited

FOREIGN PATENT DOCUMENTS

| KR | 10-2009-0037642 A | 4/2009 |
|---|---|---|
| WO | 2007/088612 A1 | 8/2007 |

OTHER PUBLICATIONS

Japanese Office Action for corresponding JP 2009-238160, mail date Oct. 1, 2013.

* cited by examiner

*FIG.8A*

PACKAGE INFORMATION

PACKAGE NAME:aaa
FILE TYPE:header
VERSION:1.0-0
ADMINISTRATOR:canon

INSTALLATION DESTINATION:main
INSTALLATION TIME PERIOD:
 main:1200sec
 file:1sec
INCLUDED PATH:/XXX/include/aaa
FILE:aaa-header-0.0-0
REPOSITORY:"http://repository/repos/work/aaa/interface/tags/rel-1.0-0"

FIG.8B

PACKAGE INFORMATION

PACKAGE NAME:enginecon
FILE TYPE:source
VERSION:1.0.0-0
ADMINISTRATOR:canon

INSTALLATION DESTINATION:engine
INSTALLATION TIME PERIOD:
  engine:2400sec
  file:60sec
INCLUDED PATH:/XXX/include/accfax
FILE:accfax-release-1.0.0-0
REPOSITORY:"http://repository/repos/work/enginecon/source/tags/rel-1.0.0-0"

IMAGE FORMING APPARATUS INCLUDING FIRMWARE, METHOD OF CONTROLLING IMAGE FORMING APPARATUS, AND STORAGE MEDIUM

BACKGROUND OF THE INVENTION

1. Field of the Invention

The present invention relates to an image forming apparatus which is capable of notifying a user of information concerning firmware update, a method of controlling the image forming apparatus, and a non-transitory computer-readable storage medium storing a computer-executable program for causing a computer to execute the method.

2. Description of the Related Art

Conventionally, the update of firmware used in an image forming apparatus, such as a digital multifunction peripheral, has generally been performed at a customer's place by a service person of a sales company. However, recent improvement of the environment of the Internet has made it possible to notify an image forming apparatus only of a portion of firmware to be updated via the Internet. This enables the user to update the firmware of the image forming apparatus without requiring a service person to visit his/her place where the image forming apparatus is installed.

In a case where a user updates the firmware of an image forming apparatus, the user is required to determine timing for firmware update depending on use conditions of the image forming apparatus. For the user to determine the update timing, it is necessary for a firmware supplier to supply the user with information concerning an update based on which the user can determine the update timing.

Information on a processing time period required for a firmware update can be mentioned as an important piece of information to be supplied to the user. To notify the user (or another apparatus) of the processing time period required for the firmware update, it can be envisaged to set and display a processing time period which is to be uniformly predicted, on the user's image forming apparatus, whenever an update event occurs. However, even image forming apparatuses of the same model have different firmware configurations, and further there occurs variation in differences corresponding to portions of firmware to be updated, between older versions which are to be updated to the newest version, even though the update finally causes the firmware to have the same contents. This makes it impossible to uniformly estimate the processing time period.

To solve this problem, there has conventionally been proposed a method of calculating an update processing time period required for a firmware update (see e.g. Japanese Patent Laid-Open Publication No. 2007-334636). According to Japanese Patent Laid-Open Publication No. 2007-334636, in the case of updating firmware, modules to be updated are determined based on version numbers of respective modules constituting software, and update time is calculated by adding up data transfer time periods, rewriting time periods, and overhead time periods for determining rewrite positions.

In actual firmware update processing executed in an image forming apparatus, the reboot for switching the operation mode of the system occurs a plurality of times, and the number of reboots and time taken for the reboots affect processing time for the entire update. For this reason, it is necessary to take into account the number of reboots and time required for the reboots in calculating an update processing time period required for a firmware update. Further, in order to enable a user to perform update in a reassured manner, it is important to notify the user, during the update processing, of an update status as to which portion of the firmware is actually being updated, how many reboots will be required, and when the system will reboot, and so forth. However, in the conventional update time-calculating method, reboots which occur during execution of firmware update are not taken into account.

SUMMARY OF THE INVENTION

The present invention provides an image forming apparatus which makes it possible to improve the ease and convenience of a firmware update process, a method of controlling the image forming apparatus, and a non-transitory computer-readable storage medium storing a computer-executable program for causing a computer to execute the method.

In a first aspect of the present invention, there is provided an image forming apparatus including storage means, comprising a first acquisition unit configured to identify a module requiring an update and acquire a corresponding update module from a supply source of modules constituting firmware, a second acquisition unit configured to acquire module information based on the update module, an identification unit configured to identify a particular storage means as an installation destination where the update module acquired by said first acquisition unit is to be installed, based on the module information acquired by said second acquisition unit, a calculation unit configured to calculate update processing information required to install the update module acquired by said first acquisition unit in the particular storage means identified by said identification unit, and an output unit configured to output information based on the update processing information calculated by said calculation unit.

In a second aspect of the present invention, there is provided a method of controlling an image forming apparatus including storage means, comprising identifying a module requiring an update and acquiring a corresponding update module from a supply source of modules constituting firmware, acquiring module information based on the update module, identifying a particular storage means as an installation destination where the acquired update module is to be installed, based on the acquired module information, calculating update processing information required to install the acquired update module in the identified storage means, and outputting information based on the calculated update processing information.

In a third aspect of the present invention, there is provided a non-transitory computer-readable storage medium storing a computer-executable program for causing a computer to execute a method of controlling an image forming apparatus including a storage unit, wherein the method comprises identifying a module requiring an update and acquiring a corresponding update module from a supply source of modules constituting firmware, acquiring module information based on the update module, identifying a particular storage means as an installation destination where the acquired update module is to be installed, based on the acquired module information, calculating update processing information required to install the acquired update module in the identified storage means, and outputting information based on the calculated update processing information.

According to the present invention, a user can determine update timing based on a notification of update time and execute update processing. This makes it possible to improve the ease and convenience of firmware update processing.

The features and advantages of the invention will become more apparent from the following detailed description taken in conjunction with the accompanying drawings.

BRIEF DESCRIPTION OF THE DRAWINGS

FIGS. 8A and 8B are diagram of examples of package information acquired by the image forming apparatus.

DETAILED DESCRIPTION OF THE EMBODIMENTS

The present invention will now be described in detail below with reference to the accompanying drawings showing an embodiment thereof. It should be noted that component elements of the embodiment of the present invention are described only by way of example, and the scope of the present invention is by no means limited to the embodiment.

Figure 1:
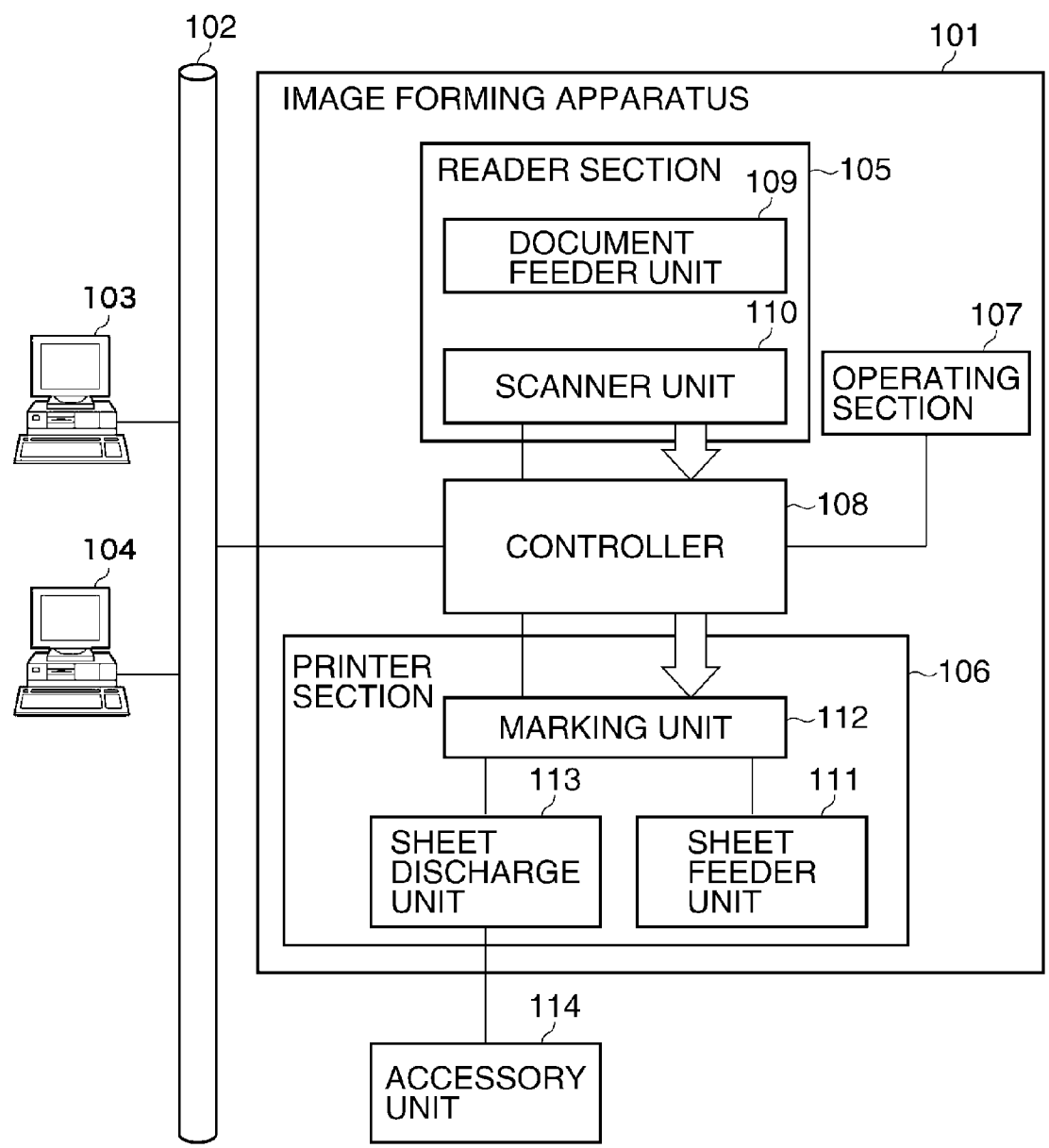
FIG. 1 is a block diagram of an image forming apparatus according to an embodiment of the present invention.

FIG. 1 is a block diagram of an image forming apparatus according to the embodiment of the present invention.

Referring to FIG. 1, the image forming apparatus 101 is implemented by a digital multifunction peripheral which is communicable with information processing apparatuses (a first host computer 103, a second host computer 104, and an update server 311, referred to hereinafter, are examples thereof in the present embodiment) connected to the image forming apparatus 101 via a LAN (Local Area Network) 102. The LAN 102 is implemented e.g. by Ethernet (registered trademark).

The image forming apparatus 101 comprises a reader section 105, a printer section 106, an operating section 107, and a controller 108. The controller 108 is connected to the reader section 105, the printer section 106, and the operating section 107, and controls the overall operation of the image forming apparatus 101. The operating section 107 is used to display the functions of the image forming apparatus 101 and images, and configure various settings of the image forming apparatus.

The reader section 105 comprises a document feeder unit 109 and a scanner unit 110, and performs read processing for reading an image from a document. The document feeder unit 109 conveys an original to be read to a document reading position. The scanner unit 110 optically reads an image from the original and converts the image to image data as electric signals.

The printer section 106 comprises a sheet feeder unit 111, a marking unit 112, and a sheet discharge unit 113, and performs print processing for printing an image on a recording sheet. The sheet feeder unit 111 comprises a plurality of sheet feeder cassettes containing recording sheets. The marking unit 112 performs print processing for transferring and fixing an image on a recording sheet fed from the sheet feeder unit 111. The sheet discharge unit 113 discharges a recording sheet having undergone print processing in the marking unit 112 into a post-processing unit connected to the image forming apparatus 101 or a discharge section of the image forming apparatus 101.

In the present embodiment, the image forming apparatus 101 has an accessory unit 114 connected thereto as a post-processing unit (finisher). The accessory unit 114 performs finishing processes, such as sorting, stapling, etc., on recording sheets having undergone print processing in the marking unit 112 and discharges the recording sheets into the discharge section.

Figure 2:
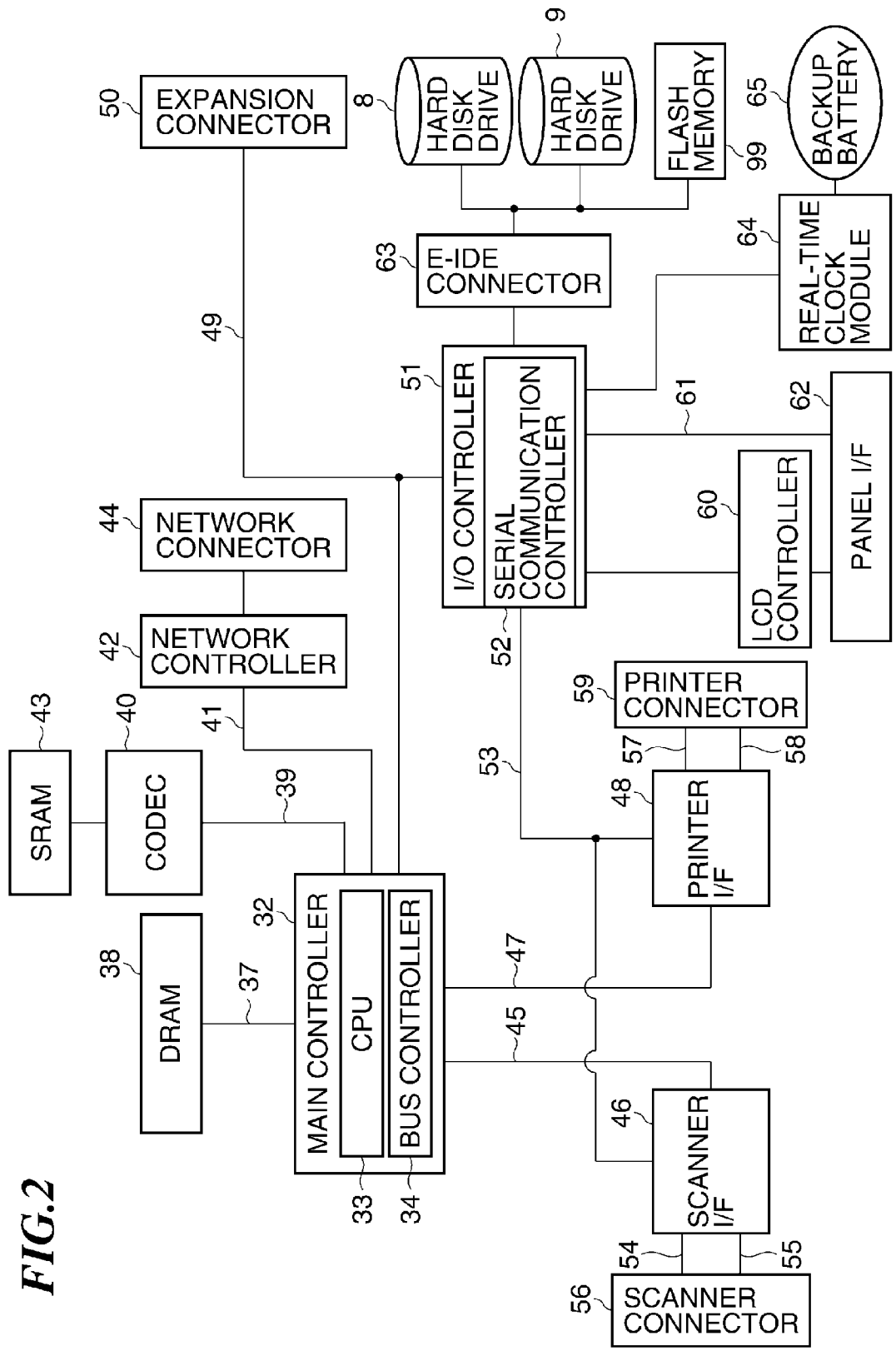
FIG. 2 is a detailed block diagram of a controller of the image forming apparatus.

FIG. 2 is a detailed block diagram of the controller of the image forming apparatus.

As shown in FIG. 2, the controller 108 includes a main controller 32, a network controller 42, and an input/output (I/O) controller 51. The main controller 32 incorporates a CPU 33, a bus controller 34, and functional blocks including various kinds of controller circuits. The main controller 32 is connected to a DRAM (Dynamic Random Access Memory) 38 via a DRAM interface (I/F) 37. Further, the main controller 32 is connected to a codec 40 via a codec interface (I/F) 39 and to the network controller 42 via a network interface (I/F) 41.

The DRAM 38 is used as a work area for operation of the CPU 33 and a storage area for storing image data. The codec 40 compresses raster image data stored in the DRAM 38, by MH, MR, MMR, JBIG, or a like well-known compression method, and expands compressed data into raster image data. An SRAM (Static Random Access Memory) 43 is connected to the codec 40, and provides a temporary work area for the codec 40. The network controller 42 performs a predetermined control operation with the LAN 102 via a network connector 44 to control communication with the first host computer 103, the second host computer 104, and the update server 311, referred to hereinafter.

Further, the main controller 32 is connected to a scanner interface (I/F) 46 via a scanner bus 45 and to a printer interface (I/F) 48 via a printer bus 47. Furthermore, the main controller 32 is connected to an expansion connector 50 for connection of an expansion board and to the I/O controller 51 via a general-purpose high-speed bus 49 implemented by a PCI bus or the like. The I/O controller 51 is provided with a 2-channel start-stop synchronization serial communication controller 52 for exchanging control commands with the reader section 105 and the printer section 106. The serial communication controller 52 is connected to the scanner interface 46 and the printer interface 48 via an input/output (I/O) bus 53.

The scanner interface 46 is connected to a scanner connector 56 via a first start-stop synchronization serial interface (I/F) 54 and a first video interface (I/F) 55. The scanner connector 56 is connected to the scanner unit 110 of the reader section 105. The scanner interface 46 performs binarization processing and magnification processing in a main and/or sub scanning direction, on image data received from the scanner unit 110. Further, the scanner interface 46 generates a control signal based on a video signal delivered from the scanner unit 110 and transfers the generated control signal to the main controller 32 via the scanner bus 45.

The printer interface 48 is connected to a printer connector 59 via a second start-stop synchronization serial interface (I/F) 57 and a second video interface (I/F) 58. The printer connector 59 is connected to the marking unit 112 of the printer section 106. The printer interface 48 performs smoothing processing on image data output from the main controller 32 and delivers the processed image data to the marking unit 112. Further, the printer interface 48 delivers to the printer bus 47 a control signal generated based on a video signal delivered from the marking unit 112. Further, the printer interface 48 interprets PDL (Page Description Language) data received from one of the first and second host computers 103 and 104, and converts the PDL data to raster image data.

The bus controller 34 controls transfer of data input or output from the reader section 105 connected to the scanner interface 46, the printer section 106 connected to the printer interface 48, external devices connected to the expansion connector 50, and so forth. The bus controller 34 performs arbitration during bus contention and control of DMA (Direct Memory Access) data transfer. For example, data transfer between the DRAM 38 and the codec 40, data transfer from the scanner unit 110 to the DRAM 38, data transfer from the DRAM 38 to the marking unit 112 and so forth are controlled by the bus controller 34, for DMA transfer.

The I/O controller 51 is connected to a panel interface (I/F) 62 via an LCD controller 60 and a key input interface (I/F) 61. The panel interface 62 is connected to the operating section 107. Further, the I/O controller 51 is connected to hard disk drives 8 and 9 and a flash memory 99 via an E-IDE (Enhanced-Integrated Drive Electronics) connector 63. The flash memory 99 stores various control programs for use in control of the main controller 32 and various data storage areas. Further, the I/O controller 51 is connected to a real-time clock module (RTC) 64 provided to update and store date and time managed in the image forming apparatus. The RTC 64 is connected to a backup battery 65 so as to be backed up by the same.

Figure 3:
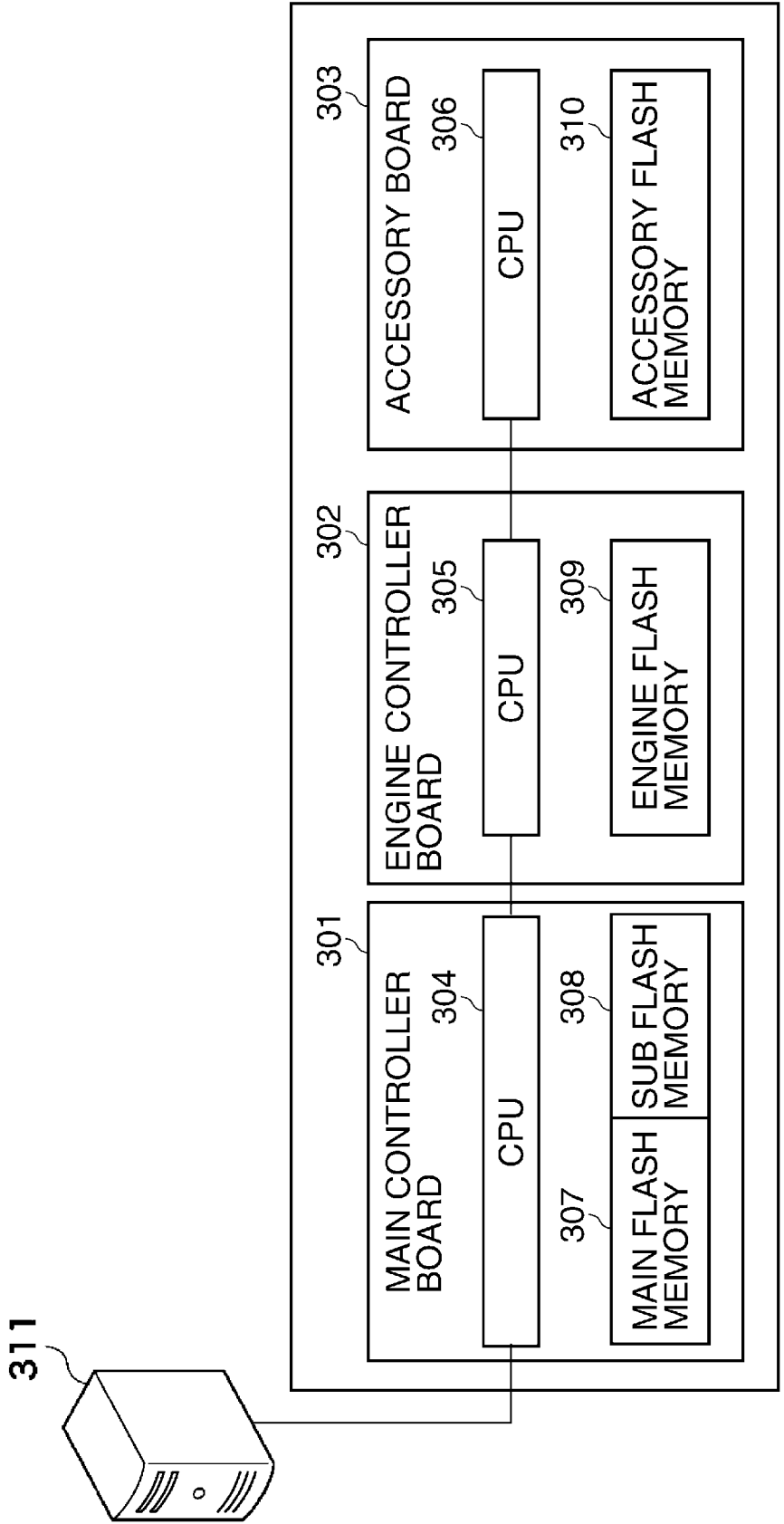
FIG. 3 is a block diagram of a main controller board, an engine controller board, and an accessory board of the image forming apparatus, each of which is provided with a CPU and a flash memory.

FIG. 3 is a block diagram of a main controller board 301, an engine controller board 302, and an accessory board 303 of the image forming apparatus, each of which is provided with a CPU and a flash memory.

Referring to FIG. 3, the main controller board 301 is configured to control the overall operation of the image forming apparatus, and corresponds to the controller 108 appearing in FIG. 1. The engine controller board 302 is configured to control the printing operation of the printer section 106 appearing in FIG. 1. The engine controller board 302 is incorporated in the printer section 106 in FIG. 1 and is connected to the printer connector 59 appearing in FIG. 2. The accessory board 303 is configured to control the operation of the accessory unit 114 appearing in FIG. 1. The accessory board 303 is incorporated in the accessory unit 114 and is connected to the engine controller board 302.

The main controller board 301 comprises a CPU 304 that controls the overall operation of the image forming apparatus, and a main flash memory 307 and a sub flash memory 308. More specifically, the single flash memory (flash memory 99 in FIG. 2) is partitioned into the main flash memory 307 and the sub flash memory 308. The main flash memory 307 stores a group of program modules (hereinafter simply referred to "modules") that control the normal operation of the image forming apparatus. The sub flash memory 308 stores a module responsible for performing update processing.

The engine controller board 302 comprises a CPU 305 that controls the operation of the printer section 106, and an engine flash memory 309. The engine flash memory 309 stores an engine controller module.

The accessory board 303 comprises a CPU 306 that controls the operation of the accessory unit 114, and an accessory flash memory 310. The accessory flash memory 310 stores a module for the accessory function (of the accessory unit 114) of the image forming apparatus 101.

When any of the modules stored in the above-described flash memories are to be updated, the image forming apparatus 101 communicates with the update server 311 via the LAN 102 to acquire associated new modules and install the same.

Next, with reference to FIGS. 4A and 4B to FIG. 10, a description will be given of operations of the image forming apparatus 101 according to the present embodiment configured as above.

First, the firmware update mechanism of the image forming apparatus 101 will be described with reference to FIGS. 4A, 4B, 5, 6, and 7.

Figure 4A:
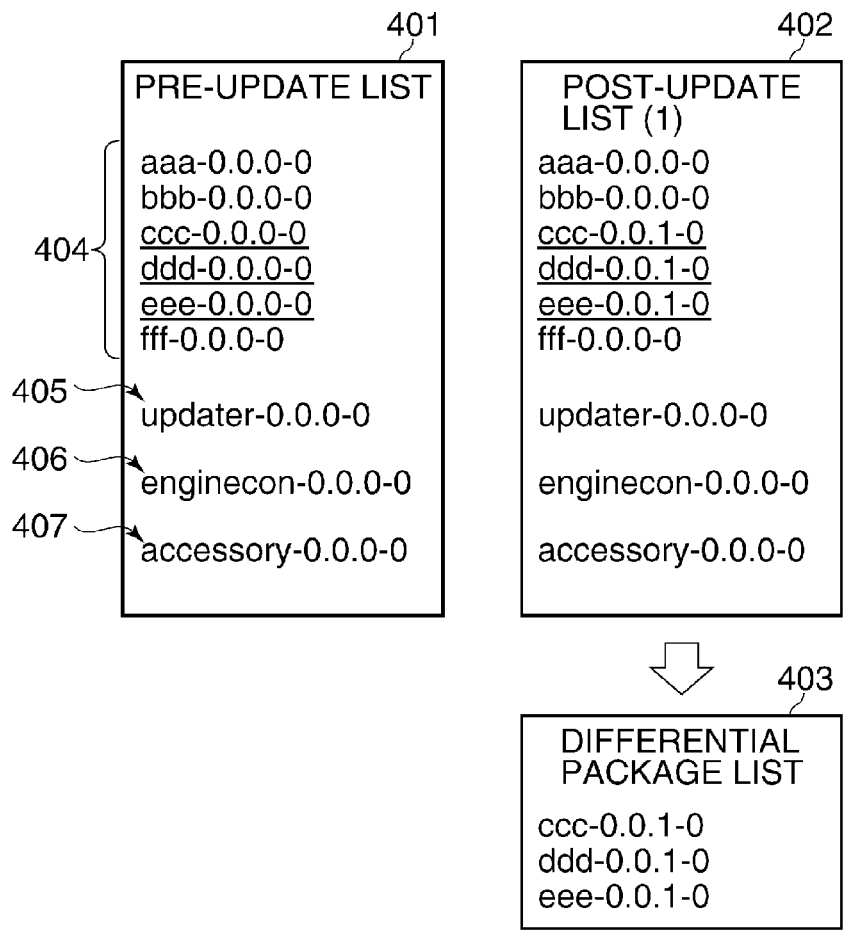
FIGS. 4A and 4B are examples of package lists provided in the image forming apparatus.
Figure 4B:
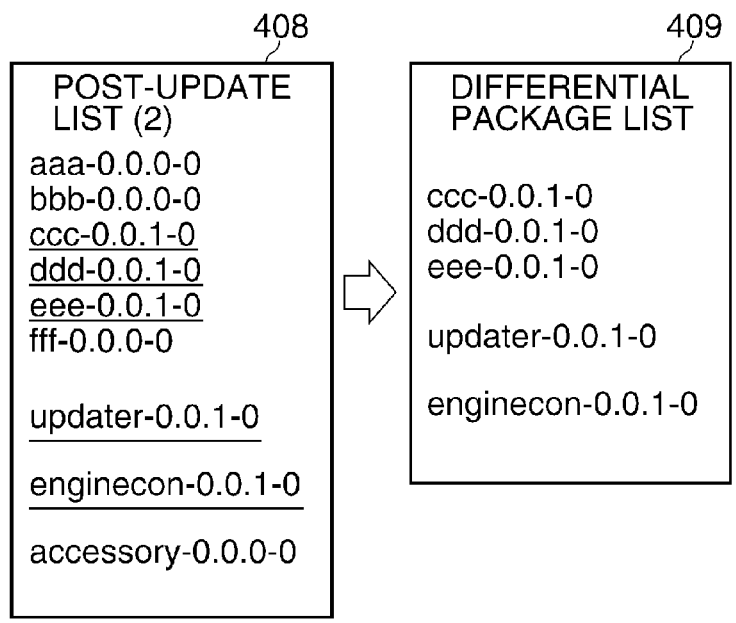

FIGS. 4A and 4B are views of examples of package lists provided in the image forming apparatus 101.

Referring to FIGS. 4A and 4B, reference numerals 401, 402, and 408 denote examples of lists of modules called "packages" which are provided in the image forming apparatus 101. The firmware of the image forming apparatus 101 is formed by a group of these packages.

For example, in the list 401 in FIG. 4A, packages 404 of "aaa-0.0.0-0" to "fff-0.0.0-0" are stored in the main flash memory 307 of the main controller board 301. Further, a package 405 "updater-0.0.0-0" is stored in the sub flash memory 308. A package 406 "enginecon-0.0.0-0" is stored in the engine flash memory 309 of the engine controller board 302. A package 407 "accessory-0.0.0-0" is stored in the accessory flash memory 310 of the accessory board 303.

Next, the outline of a firmware update process for updating the firmware of the image forming apparatus 101 will be described with reference to FIG. 5.

Figure 5:
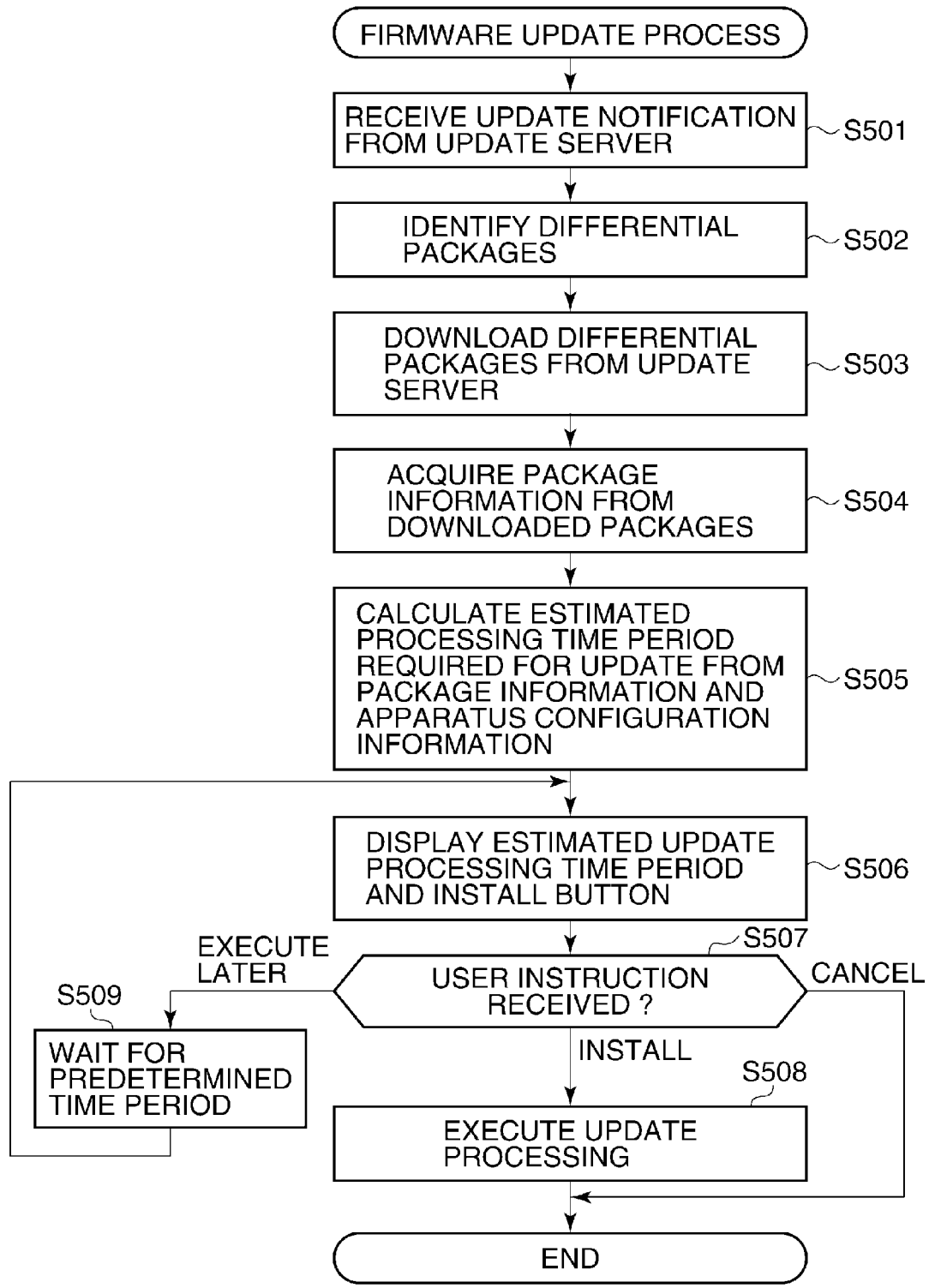
FIG. 5 is a flowchart showing the outline of a firmware update process for updating firmware of the image forming apparatus.
Figure 6:
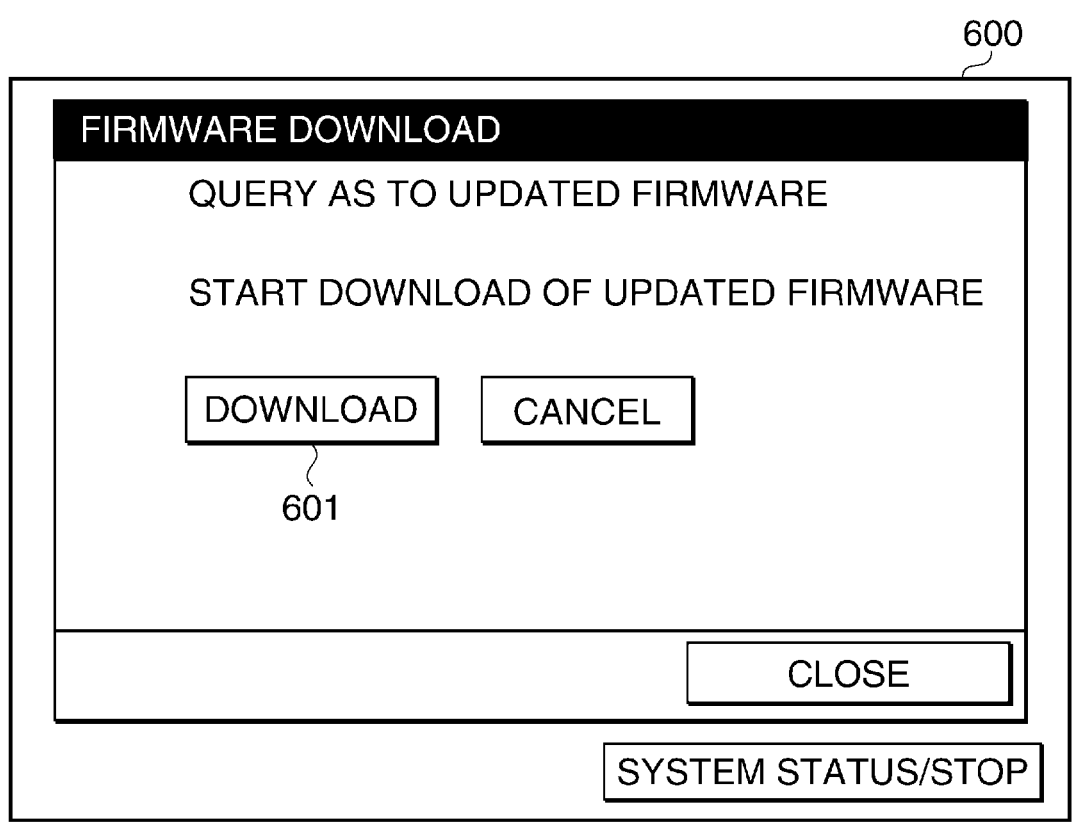
FIG. 6 is a view illustrating a download start screen of the image forming apparatus.

FIG. 5 shows the outline of the firmware update process for updating the firmware of the image forming apparatus 101. The present process is executed by the CPU 304 according to a program (program code) stored in the main flash memory 307 of the main controller board 301 of the image forming apparatus 101.

As shown in FIG. 5, the CPU 304 of the main controller board 301 receives a firmware update notification from the update server 311 (supply source of modules) (step S501). At this time, the CPU 304 activates an updater tool (the package 405 "updater-0.0.0-0" in the list 401) in the sub flash memory 308. Alternatively, the user may activate the updater tool via the operating section 107 and press a "download" button 601 on a download start screen 600, shown in FIG. 6, which is displayed on the operating section 107 to thereby query the update server 311 as to an updated package.

Then, the CPU 304 identifies differential packages (i.e. modules as update targets to which corresponding packages in current use are to be updated) requiring update, based on the contents of the update notification received from the update server 311 (step S502). For example, as shown in FIG. 4A, a comparison is performed between the list (pre-update package list) 401 and the list (post-update package list (1)) 402 sent from the update server 311, thereby identifying individual differential packages to prepare a differential package list 403 of the identified differential packages. Next, the CPU 304 downloads the differential packages identified in the step S502, from the update server 311 (step S503: first acquisition unit), and temporarily stores the downloaded differential packages in a predetermined storage area in the controller 108.

Then, the CPU 304 acquires package information (module information) written in a package information file contained in each of the downloaded differential packages (step S504: second acquisition unit). Next, the CPU 304 calculates an estimated processing time period required for execution of the firmware update, using not only the thus acquired package information, but also apparatus configuration information on the image forming apparatus 101 (i.e. information indicative of apparatus configuration including information as to whether optional devices are connected to the image forming apparatus 101) (step S505). The method of calculating the estimated processing time period will be described in detail hereinafter.

Figure 7:
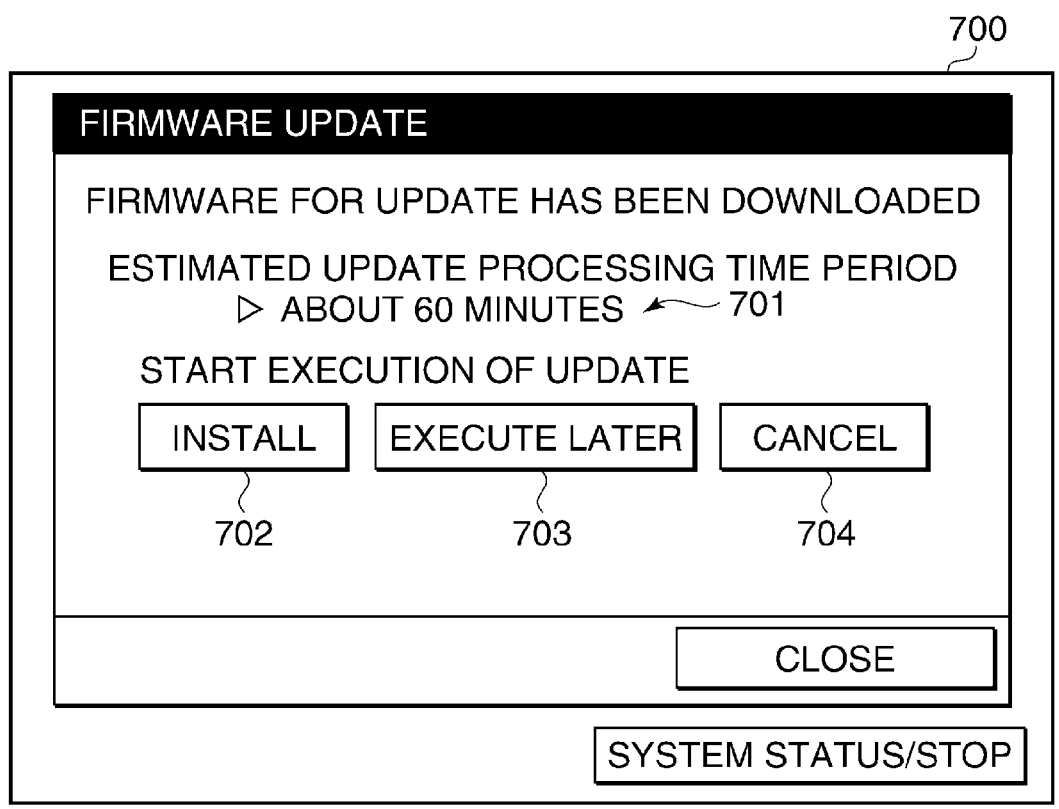
FIG. 7 is a view illustrating an update start screen of the image forming apparatus.

After having calculated the estimated processing time period, the CPU 304 displays an update start screen (installation start screen) 700 shown in FIG. 7 on the operating section 107 (step S506). On the update start screen 700, an estimated update processing time period 701, an "install" button 702, an "execute later" button 703, and a "cancel" button 704 are displayed for the user. The display (notification) of the estimated update processing time period 701 on the update start screen 700 enables the user to check the estimated update processing time period.

Then, the CPU 304 determines whether or not an instruction has been received from the user via the operating section 107, i.e. whether or not an instruction has been given by user operation on the update start screen 700 displayed on the operating section 107 (step S507). If the user has given an instruction by pressing the "install" button 702, the CPU 304 executes update processing (step S508). If the user has given an instruction by pressing the "execute later" button 703, the CPU 304 waits for a predetermined time period (step S509) and then displays the update start screen 700 again in the step S506. If the user has given an instruction by pressing the "cancel" button 704, the CPU 304 immediately terminates the present process.

The processing time period required for update processing includes the following time periods:
(1) file size-dependent time periods depending on the respective file sizes (module sizes) of differential packages (modules) to be installed in respective associated flash memories (e.g. time periods for loading the differential packages, time periods for transferring the differential packages, and time periods for writing the same in the associated flash memories)
(2) a total reboot time period involved in reboots during the update process (the number of reboots×single reboot time)

The processing time periods (1) and (2) are added up, whereby the update processing time period required for the update processing can be determined. Each processing time period is determined depending on which flash memory an identified differential package is to be installed in. In the image forming apparatus 101, update processing is performed by acquiring only differential packages from the update server 311 and installing them, as described above. Therefore, flash memories as installation destinations and the number of reboots vary depending on a combination of differential packages.

Next, a description will be given of a method of identifying an installation destination of each differential package and an installation processing time period for update.

As described in the step S504 in FIG. 5, the image forming apparatus 101 reads out a package information file from each differential package downloaded from the update server 311, and acquires package information. FIGS. 8A and 8B illustrate examples of package information.

Package information (module information) includes information items of a package name (module name), a file type, a version, an administrator, an installation destination, an installation time period, and so forth. In FIG. 8A, "installation destination:" shows that the main flash memory 307 is an installation destination. Further, as for time required for installation associated with the installation destination, "installation time period:" shows that a fixed processing time period associated with the main flash memory 307 is 1200 sec. and a file size-dependent time period is 1 sec.

Similarly, in FIG. 8B, "installation destination:" shows that the engine flash memory 309 is an installation destination. Further, as for time required for installation in the installation destination, "installation time period:" shows that a fixed processing time period associated with the engine flash memory 309 is 2400 sec. and a file size-dependent time period is 60 sec.

As for the installation time period, it is not an only method to have a value thereof written in package information in advance as mentioned above, but it is also possible to store an average processing speed (average processing time period per file size unit) of each flash memory in the image forming apparatus 101 and calculate the installation time period based on the size of each package file.

Further, when an installation destination recorded in package information is not included in the apparatus configuration of the image forming apparatus 101, a differential package associated with the installation destination is by no means installed, and a time period to be required for installation of the package is not added to the update processing time period. For example, optional devices called accessories including a finisher are not connected to image forming apparatuses of some kinds, and in such cases, even if a differential package associated with an accessory which is not connected to the image forming apparatus 101 is identified as one for update in the step S502 in FIG. 5, the differential package is excluded from packages to be installed.

Now, a description will be given of a method of identifying the number of reboots as a parameter for calculating the above-mentioned total reboot time period (2) (the number of reboots×single reboot time).

The reason why the reboot occurs during update processing is that it is necessary to switch the operation mode of the system to perform firmware update. The image forming apparatus 101 according to the present embodiment is switched from a normal mode for executing job processing and the like (hereinafter simply referred to as "the normal mode") to a maintenance mode in which the firmware update can be executed (hereinafter simply referred to as "the maintenance mode").

To operate in the normal mode, the image forming apparatus 101 is started up from the main flash memory 307, whereas in performing the update processing, the image forming apparatus 101 is started up from the sub flash memory 308 so as to operate in the maintenance mode (which will be referred to as "the main maintenance mode). Then, the main flash memory 307, the engine flash memory 309, and the accessory flash memory 310 are sequentially updated.

On the other hand, in updating the very updater (module itself that executes update in the main maintenance mode) stored in the sub flash memory 308, the following update processing is executed: The image forming apparatus 101 is started up from the main flash memory 307 so as to operate in the maintenance mode (which will be referred to as "the sub maintenance mode), and then the update of the sub flash memory 308 is executed. When this switching of the operation mode is performed, the reboot occurs, so that a mode to be selected is determined by identifying a flash memory as an installation destination of each of differential packages, whereby the number of reboots is determined.

For example, in the case shown in FIG. 4A, the differential package list 403 contains differential packages all of which are to be stored in the main flash memory 307, and therefore installation takes place only in the main flash memory 307. In this case, an update execution process as shown in FIG. 9A is executed, and the reboot occurs two times.

Figure 9A:
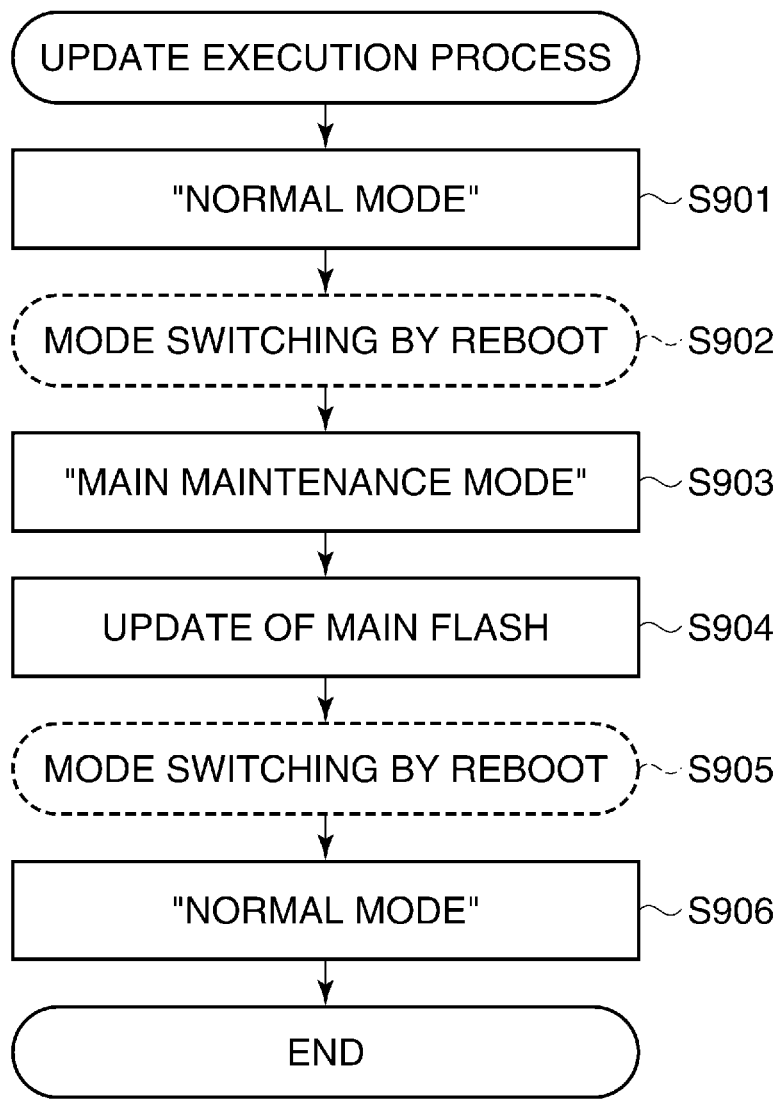
FIG. 9A is a flowchart showing an example of an update execution process for executing firmware update of the image forming apparatus.

FIG. 9A is a flowchart showing an example of the update execution process for executing the firmware update of the image forming apparatus 101.

As shown in FIG. 9A, the image forming apparatus 101, which is in "the normal mode" (step S901), performs mode switching from "the normal mode" by a reboot (step S902) and shifts to "the main maintenance mode" (step S903) so as to execute update processing. Thereafter, the update of the main flash memory 307 is executed (step S904), and then mode switching is performed by a reboot (step S905) again, whereby the image forming apparatus 101 returns to "the normal mode" (step S906).

Assuming, for example, as shown in FIG. 4B, that the list (post-update package list (2)) 408 is obtained, a differential package list 409 of differential packages is acquired, and installation occurs in each of the main flash memory 307, the sub flash memory 308, and the engine flash memory 309. In this case, an update execution process as shown in FIG. 9B is executed, and the reboot occurs three times.

It is assumed that in the step S902 in FIG. 9A, the image forming apparatus 101 is restarted, whereby the reboot occurs. In general, in the case of starting up the image forming apparatus 101, electric power is supplied not only to the controller 108, but also to the reader section 105 and the printer section 106. However, the reboot in the step S902 is performed to switch the mode from "the normal mode" to "the maintenance mode". In the maintenance mode, since update of the main flash memory 307 is performed, no image forming operation using the reader section 105 and the printer section 106 is performed. Therefore, in the case of restarting the image forming apparatus 101 by the reboot in the step S902, it is not required to supply electric power to the component elements (the reader section 105, the printer section 106, etc.) for use in an image forming operation. This makes it possible to reduce power consumption by the image forming apparatus 101 in the maintenance mode in which no image forming operation is performed. During the reboot in the step S905 carried out later, electric power is supplied to the reader section 105 and the printer section 106 as well.

Figure 9B:
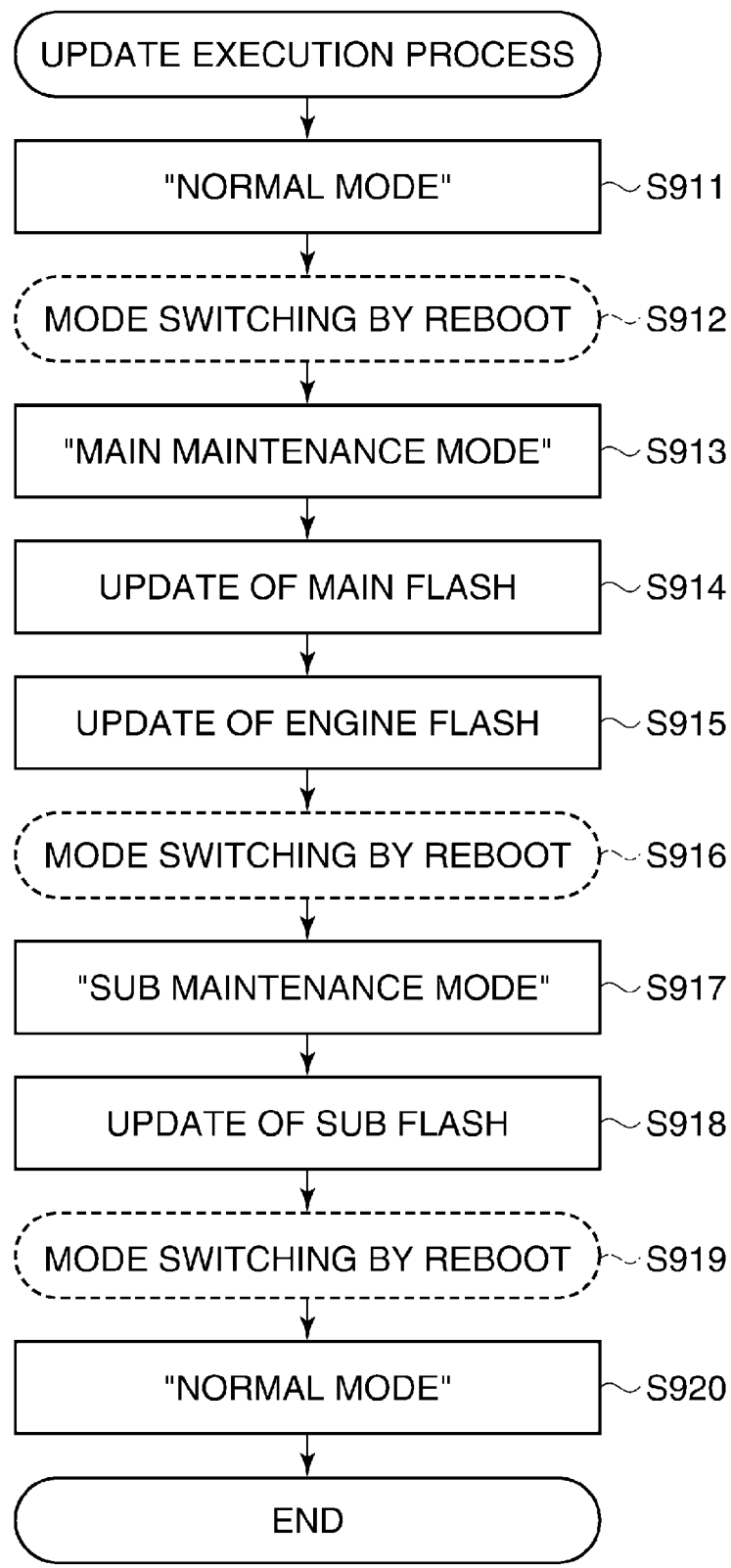
FIG. 9B is a flowchart showing another example of the update execution process for executing firmware update of the image forming apparatus.

FIG. 9B is a flowchart showing another example of the update execution process executed by the image forming apparatus 101.

As shown in FIG. 9B, the image forming apparatus 101, which is in "the normal mode" (step S911), performs mode switching from "the normal mode" by a reboot (step S912) and shifts to "the main maintenance mode" (step S913) so as to perform update processing. Thereafter, the update of the main flash memory 307 is executed (step S914), and then the update of the engine flash memory 309 is executed (step S915).

Next, the image forming apparatus 101 performs mode switching by a reboot (step S916) and shifts to "the sub maintenance mode" (step S917). Thereafter, the update of the sub flash memory 308 is executed (step S918), and then mode switching is performed by a reboot (step S919), whereby the image forming apparatus 101 returns to "the normal mode" (step S920).

It should be noted that in the steps S912 and S916, as in the step S902, it is not required to supply electric power to the component elements (the reader section 105, the printer section 106, etc.) for use in an image forming operation. This makes it possible to reduce power consumption by the image forming apparatus 101 in the maintenance mode in which image forming operation is not performed. During the reboot in the step S919 carried out later, electric power is supplied to the reader section 105 and the printer section 106 as well.

It is assumed that a time period required for a single reboot of the image forming apparatus 101 is fixed, and therefore the value of a single reboot time period is stored in the main flash memory 307. The aforementioned total reboot time period (2) is determined by obtaining the product of the number of reboots calculated whenever the update processing is to be executed and the stored value of the single reboot time period.

Figure 10:
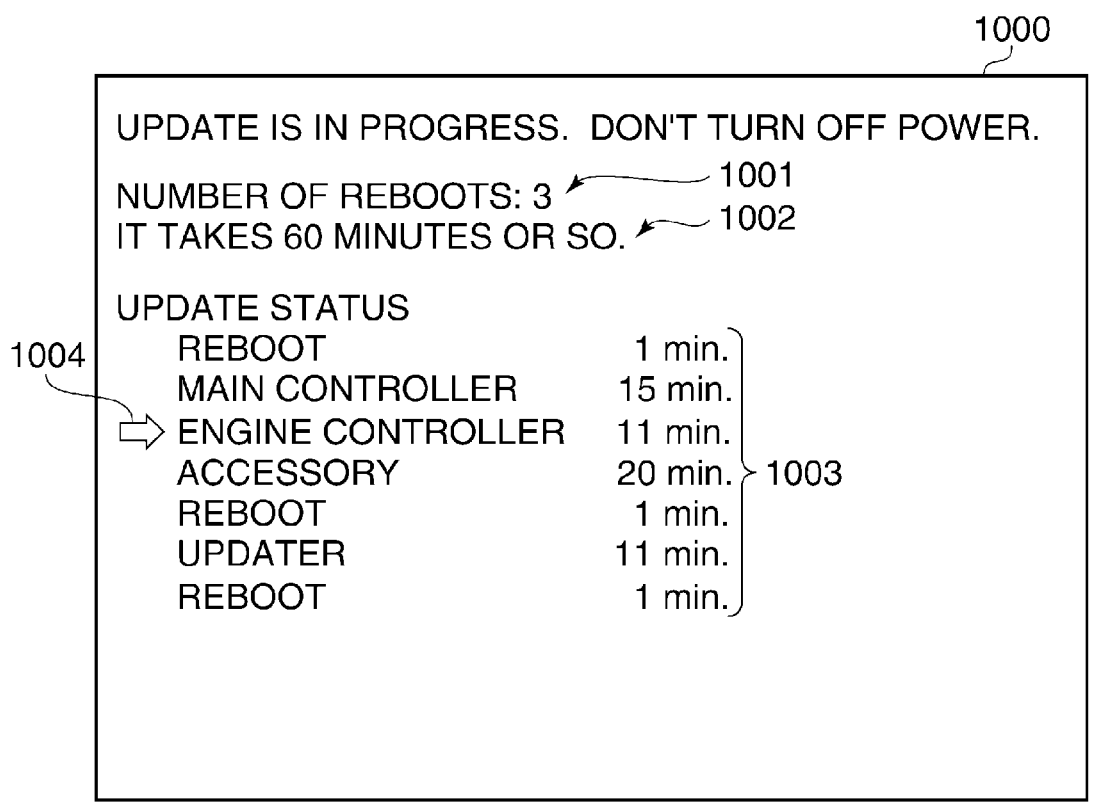
FIG. 10 is a view illustrating an update-in-progress screen of the image forming apparatus.

How the user is notified of information concerning an update will be described with reference to FIG. 10.

When the user presses the "install" button 702 on the update start screen 700, shown in FIG. 7, which is displayed on the operating section 107 of the image forming apparatus 101, the CPU 305 starts a reboot to thereby shift the image forming apparatus 101 from the normal mode to the maintenance mode. After the reboot, an update-in-progress screen 1000 is displayed on the operating section 107 to show that the update processing is in progress. On the update-in-progress screen 1000 are displayed the number of reboots 1001 also used for calculation of the update processing time period and the update processing time period 1002 also displayed before the start of the execution of the update. This makes it possible to notify the user of the update processing time period.

It is also possible to display an update status 1003 on the update-in-progress screen 1000 and indicate a stage of the progress of the current update/reboot by a cursor 1004. In this case, it is also possible to display respective values of processing time periods which are added up to calculate the update processing time period (i.e. names of respective flash memories of boards and respective time periods required for update thereof, and reboot occurrence timing and each time period required therefor), under the update status 1003. This makes it possible to notify the user (or another apparatus) of more detailed processing time.

As described above in detail heretofore, according to the present embodiment, the image forming apparatus identifies differential packages requiring update, acquires the differential packages from the update server, and then acquires package information from each differential package. Further, the image forming apparatus identifies flash memories as installation destinations for the associated differential packages from the package information, and calculates update processing time periods required to install the differential packages in the flash memories. Furthermore, during the update processing, the image forming apparatus displays the update processing time period, the number of reboots, reboot occurrence timing, and update targets on the operating section to notify the user of these.

The user can view the display on the operating section and determine update timing in accordance with the use conditions of his/her own apparatus (image forming apparatus). Further, since it is possible to check the status of the update in progress, the user can perform firmware update in a reassured manner. This makes it possible to improve the ease and convenience of firmware update processing started by the user.

Although in the above-described embodiment, the image forming apparatus acquires a new module from the update server, this is not limitative, but it is also possible to acquire a new module e.g. via a storage medium, such as a CD-ROM or a removable medium.

Further, although in the above-described embodiment, a new module acquired by the image forming apparatus is stored in a flash memory as a storage unit, this is not limitative, but a storage unit different from a flash memory may be used to store a new module.

Aspects of the present invention can also be realized by a computer of a system or apparatus (or devices such as a CPU or MPU) that reads out and executes a program recorded on a memory device to perform the functions of the above-described embodiment, and by a method, the steps of which are performed by a computer of a system or apparatus by, for example, reading out and executing a program recorded on a memory device to perform the functions of the above-described embodiment. For this purpose, the program is provided to the computer for example via a network or from a recording medium of various types serving as the memory device (e.g., computer-readable medium).

While the present invention has been described with reference to an exemplary embodiment, it is to be understood that the invention is not limited to the disclosed exemplary embodiment. The scope of the following claims is to be accorded the broadest interpretation so as to encompass all such modifications and equivalent structures and functions.

This application claims the benefit of Japanese Patent Application No. 2009-238160, filed Oct. 15, 2009, which is hereby incorporated by reference herein in its entirety.

What is claimed is:

1. An image forming apparatus comprising:
a printing unit;
a main controller configured to control the image forming apparatus and execute a module for the main controller included in firmware of the image forming apparatus, wherein the main controller includes a processor;
a print engine controller configured to control the printing unit and disposed in the printing unit, wherein the print engine controller is configured to execute a module for the print engine controller included in the firmware of the image forming apparatus;
a plurality of storage devices, wherein one of the plurality of storage devices is disposed in the main controller, and another of the plurality of storage devices is disposed in the print engine controller;
a first acquisition unit configured to identify a module requiring an update and acquire a corresponding update module from a supply source of modules constituting the firmware of the image forming apparatus;
a second acquisition unit configured to acquire module information based on the update module;
an identification unit configured to identify a storage device from the plurality of storage devices as an installation destination where the update module acquired by said first acquisition unit is to be installed, based on the module information acquired by said second acquisition unit;
a calculation unit configured to calculate update processing information representing an update processing time period required to install the update module acquired by said first acquisition unit in the storage device identified by said identification unit and a number of reboots involved in an update process, wherein the calculation unit is configured to calculate the update processing information based on which of the plurality of storage devices was identified by said identification unit; and
an output unit configured to output, before said output unit receives an instruction to start the update process, the update processing time period required to install the acquired update module based on the update processing information calculated by said calculation unit;
wherein said calculation unit is configured to calculate the update processing time period by adding (1) a time period of a number of stages required to install the acquired update module, the calculation unit configured to calculate the time period of the number of stages in accordance with a file size of the update module, and (2) a reboot time period required according to the number of reboots involved in the update process.

2. The image forming apparatus according to claim 1, wherein each of the plurality of storage devices comprises at least two storage units, and
wherein said calculation unit is configured to calculate the number of reboots based on identification of a storage unit in which installation will take place, in a single update process, by said identification unit.

3. The image forming apparatus according to claim 1, wherein the module information includes information indicative of a module installation destination, and information indicative of an installation time period associated with the installation destination.

4. The image forming apparatus according to claim 1, wherein said output unit is configured to output information on a storage device in which an update process is in progress, during an update process.

5. The image forming apparatus according to claim 1, wherein said output unit is configured to output reboot occurrence timing information during an update process.

6. A method of controlling an image forming apparatus including a printing unit, a main controller configured to control the image forming apparatus, a print engine controller configured to control the printing unit and disposed in the printing unit, and a plurality of storage devices, wherein one of the plurality of storage devices is disposed in the main controller, and another of the plurality of storage devices is disposed in the print engine controller, the method comprising:
the main controller executing a module for the main controller included in firmware of the image forming apparatus;
the print engine controller executing a module for the print engine controller included in the firmware of the image forming apparatus;
identifying a module requiring an update and acquiring a corresponding update module from a supply source of modules constituting the firmware of the image forming apparatus;
acquiring module information based on the update module;
identifying a storage device from the plurality of storage devices as an installation destination where the acquired update module is to be installed, based on the acquired module information;
calculating update processing information representing an update processing time period required to install the acquired update module in the identified storage device and a number of reboots involved in an update process, wherein the update processing information is calculated based on which of the plurality of storage devices was identified; and
outputting, before receiving an instruction to start the update process, the update processing time period required to install the acquired update module based on the calculated update processing information, wherein the update processing time period is calculated by adding (1) a time period of a number of stages required to install the acquired update module, the time period of the number of stages calculated in accordance with a file size of the update module, and (2) a reboot time period required according to the number of reboots involved in the update process.

7. A non-transitory computer-readable storage medium storing a computer-executable program for controlling an image forming apparatus including a printing unit, a main controller configured to control the image forming apparatus, a print engine controller configured to control the printing unit and disposed in the printing unit, and a plurality of storage devices, wherein one of the plurality of storage devices is disposed in the main controller, and another of the plurality of storage devices is disposed in the print engine controller, the program comprising:

main controller executing instructions configured to cause the main controller to execute a module for the main controller included in firmware of the image forming apparatus;

print engine controller executing instructions configured to cause the print engine controller to execute a module for the print engine controller included in the firmware of the image forming apparatus;

first acquisition instructions configured to identify a module requiring an update and acquire a corresponding update module from a supply source of modules constituting the firmware of the image forming apparatus;

second acquisition instructions configured to acquire module information based on the update module;

identification instructions configured to identify a storage device from the plurality of storage devices as an installation destination where the update module acquired according to said first acquisition instructions is to be installed, based on the module information acquired according to said second acquisition instructions;

calculation instructions configured to calculate update processing information representing an update processing time period required to install the update module acquired according to said first acquisition instructions in the storage device identified according to said identification instructions and a number of reboots involved in an update process, wherein the calculation instructions are configured to calculate the update processing information based on which of the plurality of storage devices was identified according to said identification instructions; and output instructions configured to output, before receiving an instruction to start the update process, the update processing time period required to install the update module based on the update processing information calculated according to said calculation instructions, wherein said calculation instructions are configured to calculate the update processing time period by adding (1) a time period of a number of stages required to install the update module acquired according to said first acquisition instructions, the calculation instructions configured to calculate the time period of the number of stages in accordance with a file size of the update module, and (2) a reboot time period required according to the number of reboots involved in the update process.

* * * * *